US008657657B2

(12) United States Patent
Watanabe

(10) Patent No.: US 8,657,657 B2
(45) Date of Patent: Feb. 25, 2014

(54) TABLE GAME SYSTEM

(75) Inventor: Naoyuki Watanabe, Aichi (JP)

(73) Assignee: Kyoraku Industrial Co., Ltd., Nagoya-shi (JP)

( * ) Notice: Subject to any disclaimer, the term of this patent is extended or adjusted under 35 U.S.C. 154(b) by 143 days.

(21) Appl. No.: 13/153,096

(22) Filed: Jun. 3, 2011

(65) Prior Publication Data

US 2012/0276967 A1 Nov. 1, 2012

(30) Foreign Application Priority Data

Apr. 28, 2011 (JP) ................................ 2011-100447

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.

USPC .................. 463/11; 463/12; 463/25; 463/31; 463/41; 463/42; 463/43; 273/292; 348/207.1; 396/299

(58) Field of Classification Search

USPC ........ 463/11, 12, 25, 31, 41, 42, 43; 273/292; 348/207.1; 396/299

See application file for complete search history.

(56) References Cited

U.S. PATENT DOCUMENTS

| | | | | |
|---|---|---|---|---|
| 2006/0071429 | A1* | 4/2006 | Okujyo et al. | 273/292 |
| 2008/0220836 | A1* | 9/2008 | Nagano | 463/12 |
| 2010/0329661 | A1* | 12/2010 | Cuddeback | 396/299 |
| 2012/0028705 | A1* | 2/2012 | Yamauchi | 463/31 |
| 2012/0236158 | A1* | 9/2012 | Oleksy et al. | 348/207.1 |

FOREIGN PATENT DOCUMENTS

| | | |
|---|---|---|
| JP | 2005168664 | 6/2005 |

* cited by examiner

*Primary Examiner* — Adetokunbo O Torimiro

(74) *Attorney, Agent, or Firm* — Oblon, Spivak, McClelland, Maier & Neustadt, L.L.P.

(57) ABSTRACT

A table game system includes a dealer's game table for performing a table game. A movable capturing part captures game media used in the table game, and allows at least changing of a capturing direction of the movable capturing part. An operating part is arranged in a game player space provided at a position distant from the dealer's game table, and can change the capturing direction of the movable capturing part. A display part can display an image of the game media captured by the movable capturing part.

1 Claim, 10 Drawing Sheets

TABLE GAME SYSTEM

CROSS-REFERENCE TO RELATED APPLICATIONS

This application claims priority of Japanese Patent Application No. 2011-100447 filed on Apr. 28, 2011, the disclosures of which is incorporated herein by reference.

BACKGROUND

1. Field of the Invention

The present invention generally relates to a table game system using game media such as cards and roulettes, and more particularly, to a card game system that can deliver images of the game media used in a table game.

2. Description of the Related Art

Generally, card games of playing cards (for example, baccarat game) and table games such as a roulette game using a roulette are widely known as casino games.

Recently, as for a system for supporting such table games, for example, a technique has been proposed that installs a plurality of terminals (hereinafter referred to as "the player terminal (s)") used by game players at positions distant from a table (hereinafter referred to as "the dealer's game table") for a dealer to perform dealing, opening, and the like of cards, and delivers the images of the cards captured by a video camera to the player terminals (refer to Japanese Patent Application Laid-Open Publication No. 2005-168664). With such a table game system, it is possible for a large number of game players to participate in a game at the same time that is played on the dealer's game table.

Here, the video camera for capturing the images of the cards, which is described in Japanese Patent Application Laid-Open Publication No. 2005-168664, allows only manual changing of the capturing direction. For this reason, it is possible for the dealer to commit fraud, such as skillfully replacing cards in a blind angle of the camera. In such a case, a problem occurs that causes tremendous disadvantage to the game players.

SUMMARY

The present invention aims to solve the above-mentioned disadvantages, and an object thereof is to provide a table game system that can prevent fraud by a dealer and can allow game players to positively participate in a table game.

The above-mentioned object is achieved by a table game system including: a dealer's game table for performing a table game; a movable capturing part that captures game media used in the table game, and allows at least changing of a capturing direction of the movable capturing part; an operating part that is arranged in a game player space provided at a position distant from the dealer's game table, and can change the capturing direction of the movable capturing part; and a display part that can display an image of the game media captured by the movable capturing part.

Here, the "table game" recited in the present invention refers to a game played on a table, such as a card game using cards such as playing cards (for example, baccarat game), a roulette game in which a ball is thrown in a rotating wheel, and a dice game using a dice, that is, a game in which the game is started and the game result is obtained by the initiative of a dealer.

As mentioned above, according to the above-described configuration, since a game player remotely operates the movable capturing part, the game player can monitor the movement of the dealer from every angle. Hence, it is possible to reliably prevent fraud such as replacing of cards by the dealer.

Additionally, the game player can move the movable capturing part based on his/her own will. Hence, it is possible to clear up suspicion of fraud by the dealer, and to play the table game with satisfaction.

On this occasion, it is preferable that a plurality of movable capturing parts are provided, and a plurality of operating parts corresponding to the plurality of movable capturing cameras are provided.

With such a configuration, each of a plurality of game players can operate the movement of the movable capturing parts. Hence, it is possible to perform the table game with more satisfaction.

In addition, a plurality of operating parts can be provided, and the movable capturing part can be configured to be movable by each of the plurality of operating parts.

With such a configuration, a plurality of game players can commonly use a single movable capturing part. Hence, it is possible to reduce the number of movable capturing parts to be provided.

On this occasion, it is preferable that the operation of the operating part is configured to be disabled while one of the plurality of operating parts is operating the movement of the movable capturing part.

With such a configuration, while the game player is operating the movable capturing part, it is possible to prevent the movement of the movable capturing part that is unintended by the game player. Hence, it is possible to prevent a trouble between the game players over the operation of the movable capturing part.

As described above, with the table game system according to the present invention, it is possible to reliably prevent fraud by a dealer. Therefore, it is possible for the game players to positively play a table game.

DESCRIPTION OF THE EMBODIMENTS

Hereinafter, a detailed description is given of embodiments of the present invention with reference to the drawings.

First, referring to FIG. 1 through FIG. 4, a description is given of a game place in a baccarat game system according to an embodiment of the present invention.

Figure 1:
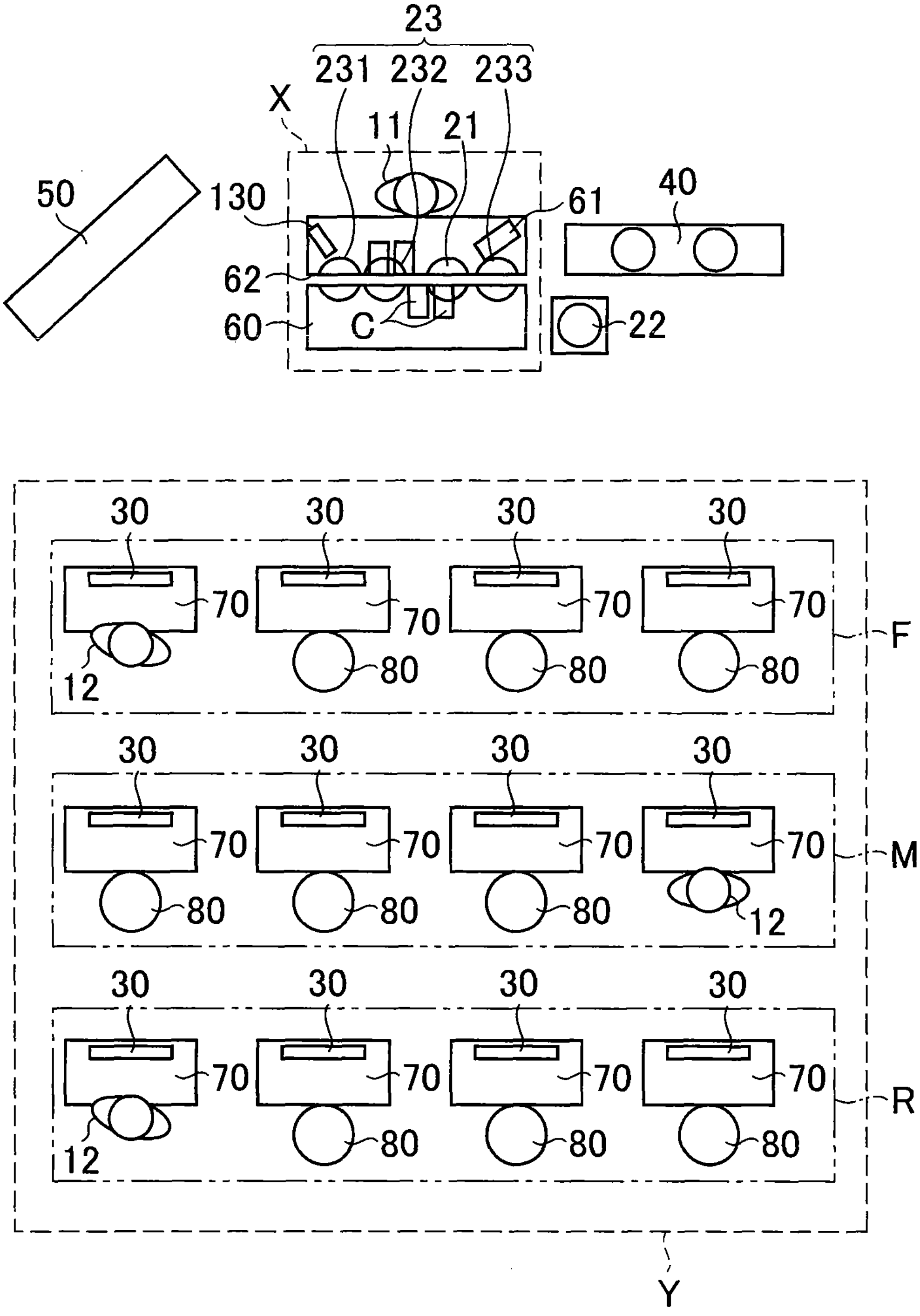
FIG. 1 is an exemplary plan view of a game place in a baccarat game system according to an embodiment of the present invention.
Figure 2:
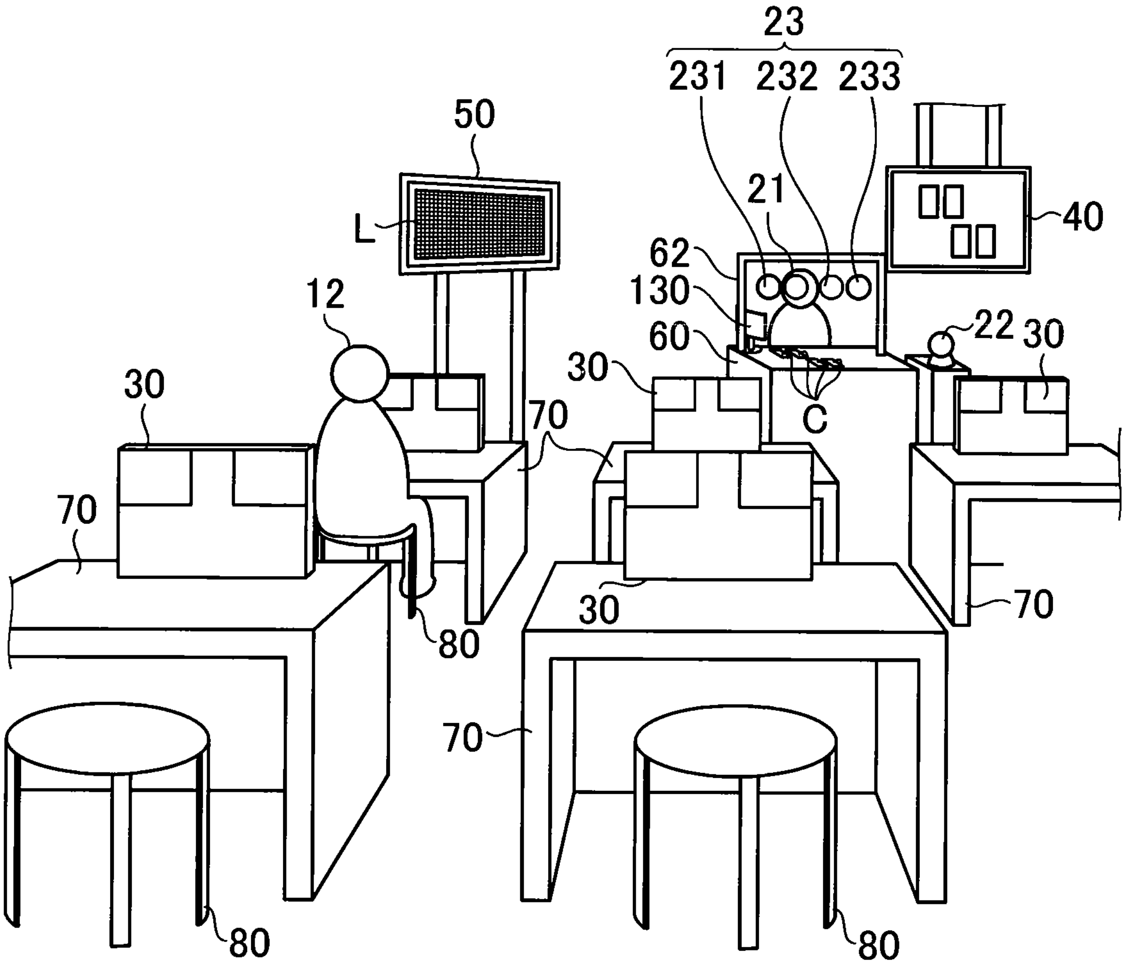
FIG. 2 is an exemplary diagram showing the game place of FIG. 1 in a three-dimensional manner.

In FIG. 1 and FIG. 2, 11 denotes a dealer, 12 denotes a game player, 21 denotes a fixed card image capturing camera for capturing the images of cards C (hereinafter referred to as “the card images”) that are actually used in a baccarat game, 22 denotes a fixed shoe image capturing camera for capturing the image of a shoe 61 (hereinafter referred to as “the shoe image”), 23 denotes cameras for capturing the card images or the shoe image in a manner similar to the fixed card image capturing camera 21 and the fixed shoe image capturing camera 22, and also denotes movable capturing cameras that allow the game player 12 to change the capturing direction and to perform magnification (zooming in) and demagnification (zooming out) of a capturing image, by operating, with a finger or the like, operation switch images 35 (see FIG. 3) displayed on a display device of a player terminal 30, which is described later, and 30 denotes terminals for players used by the game player 12. In this embodiment, the player terminals 30 are arranged in a game player space Y that is provided at a predetermined distance from a dealer’s game table 60, which is described later, in an orderly manner such that four player terminals are arranged in a lateral direction and three player terminals are arranged in a vertical direction (12 player terminals in total).

It should be noted that the movable capturing cameras 23, the player terminals 30, the dealer’s game table 60, and the game player space Y correspond to “movable capturing part”, “operating part” and “display part”, “dealer’s game table”, and “game player space” described in the claims, respectively.

The fixed card image capturing camera 21 and the fixed shoe image capturing camera 22 are, for example, video cameras for capturing an image by using a CCD, and recognizing the cards C and the like in two-dimensional shapes.

The fixed card image capturing camera 21 is attached to the dealer’s game table 60, which is described later, via a supporting member 62. Additionally, the fixed shoe image capturing camera 22 is placed on and fixed to a table or the like that is provided in the vicinity of the dealer’s game table 60.

Unlike the movable capturing cameras 23, these fixed card image capturing camera 21 and fixed shoe image capturing camera 22 are configured such that the respective capturing directions can be changed only manually.

On the other hand, the movable capturing cameras 23 are formed by, for example, video cameras using CCDs, as in the fixed card image capturing camera 21 and the fixed shoe image capturing camera 22. A plurality of (in this embodiment, three) movable capturing cameras 23 are attached to the dealer’s game table 60 via the supporting member 62 at positions adjacent to the fixed card image capturing camera 21. These plurality of movable capturing cameras 231, 232, and 233 are each provided with a drive unit, such as a motor, which can change the direction of a camera body (the capturing direction) in back and forth directions and in left and right directions.

In this embodiment, four player terminals 30 constituting a front row F, which is closest to the dealer’s game table 60, four player terminals 30 constituting an intermediate row M, which is located behind the front row F, and four player terminals 30 constituting an end row R can operate the movement of the movable capturing cameras 231, 232, and 233, respectively. It should be noted that, as described later, for example, in the case where the movement of the movable capturing camera 231 is operated by one of the four player terminals 30, the other three player terminals 30 cannot operate the movement of the movable capturing camera 231.

The player terminal 30 is formed by, for example, a PC (personal computer) including a CPU (central processing unit), a ROM, and a RAM (memory device). The player terminal 30 can display the card images and the shoe image that are captured by each of the capturing cameras (the fixed card image capturing camera 21, the fixed shoe image capturing camera 22, and the movable capturing cameras 23), dividend information, the history of game results, and the like. Additionally, the player terminal 30 includes a display device that allows an input of BET information of the game player 12. It should be noted that the player terminal 30 may be formed by, other than a PC, an interactive television, a mobile phone, or a mobile terminal such as a PDA.

Figure 3A:
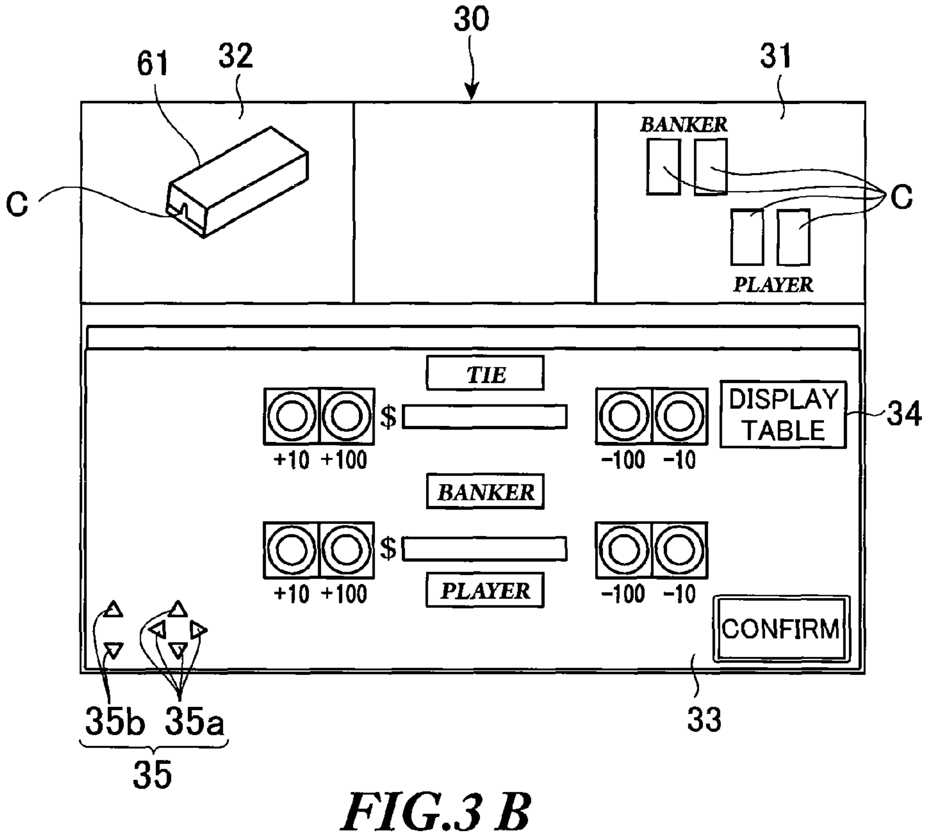
FIG. 3A is an exemplary diagram showing an example of a screen of a terminal including a subscreen display region displaying a shoe.
Figure 3B:
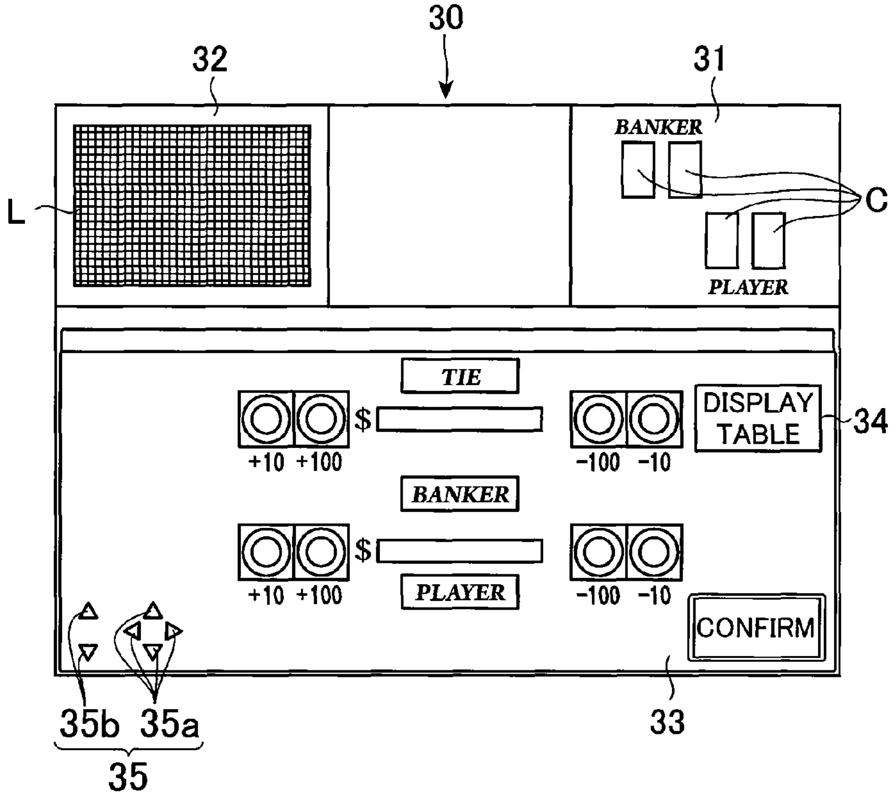
FIG. 3B is an exemplary diagram showing an example of a screen of the terminal including the subscreen display region displaying a baccarat result table.

As shown in FIG. 3, a display portion of the display device of the player terminal 30 includes a main screen display region 31, a subscreen display region 32, and a BET screen display region 33.

The main screen display region 31 is a region that can display the card image captured by the fixed card image capturing camera 21, or the card image or the shoe image captured by the movable capturing camera 23 in a switching manner.

Additionally, the subscreen display region 32 is a region that can display the shoe image captured by the fixed shoe image capturing camera 22, or a baccarat result table L (the history of game results indicating a series of recent game result data) in a switching manner.

The BET screen display region 33 is formed by a touch panel display, and is a region that allows an input of BET information by the game player 12 by touching, with a finger or the like, the BET information displayed on the BET screen display region 33. In this embodiment, the input of the BET information is performed in the BET screen display region 33 by predicting one of Banker win, Player win, and Tie, and determining the kinds of tips and the number of tips.

Additionally, the BET screen display region 33 displays, in addition to the BET information, a selecting switch image 34 that imitates a switch and can switch between the shoe image and the baccarat result table L displayed in the subscreen display region 32, and operation switch images 35 that imitate a plurality of switches and allow the game player 12 to change the capturing direction of the movable capturing camera 23 and to magnify/demagnify the capturing image (the card images and shoe image). Further, the BET screen display region 33 displays a message such as “Please BET” in accordance with the progress of a game.

In FIG. 1 and FIGS. 2, 40 and 50 denote large screens such as a plasma display, a liquid crystal display, and the like. In this embodiment, the large screen 40 is configured to mainly display the card images captured by the fixed card image capturing camera 21, and the large screen 50 is configured to mainly display the baccarat result table L, which shows the history of game results.

60 denotes the dealer’s game table for playing a baccarat game. It should be noted that, in this embodiment, the dealer’s game table 60 is used only by the dealer 11. However, the dealer’s game table 60 can be used by the dealer 11 and a small number of game players 12. Additionally, 61 denotes a shoe that is arranged at a predetermined position on the dealer’s game table 60.

70 denotes game player tables used only by the game players, and 80 denotes chairs. These game player tables 70 and chairs 80 are arranged in the game player space Y, which is provided at a predetermined distance from the dealer’s game table 60.

As described above, in this embodiment, the dealer's game table 60 is arranged in the front as a platform in a classroom, whereas the player terminals 30 for the game players are arranged as desks in the classroom, thereby separating a conventional baccarat game table into the dealer's game table 60 and the game player tables 70.

Only the dealer 11 sits at the dealer's game table 60 so as to face toward the player terminals 30 for the game players, and proceeds the baccarat game. This baccarat game is a baccarat game that is actually performed on the dealer's game table 60.

Only those required for the dealer 11, such as the shoe 61, a dealer terminal 130, a Banker card placing position, a Player card placing position and the like, are provided on the dealer's game table 60. The dealer's game table 60 is not provided with a place or the like where the game player 12 places a BET, which is provided in a normal baccarat table. Thus, a small table can be used as the dealer's game table 60.

As a general rule, one game player 12 sits on the chair 80 in front of the game player table 70 so as to face toward the small dealer's game table 60, and can see a screen of the player terminal 30 for the game player, the large screens 40 and 50, and the dealer 11. By using the game player table 70 as a personal table, it is possible to offer a personal space for the game player 12.

As described above, in this embodiment, all of the game players do not sit at a single table, and a baccarat game table is separated into the dealer's game table 60 and the game player tables 70. Therefore, it is possible to offer a wide personal space, and the game players 12 can participate in the game with concentration or in a relaxed manner, without being distracted by other people's play.

Figure 4:
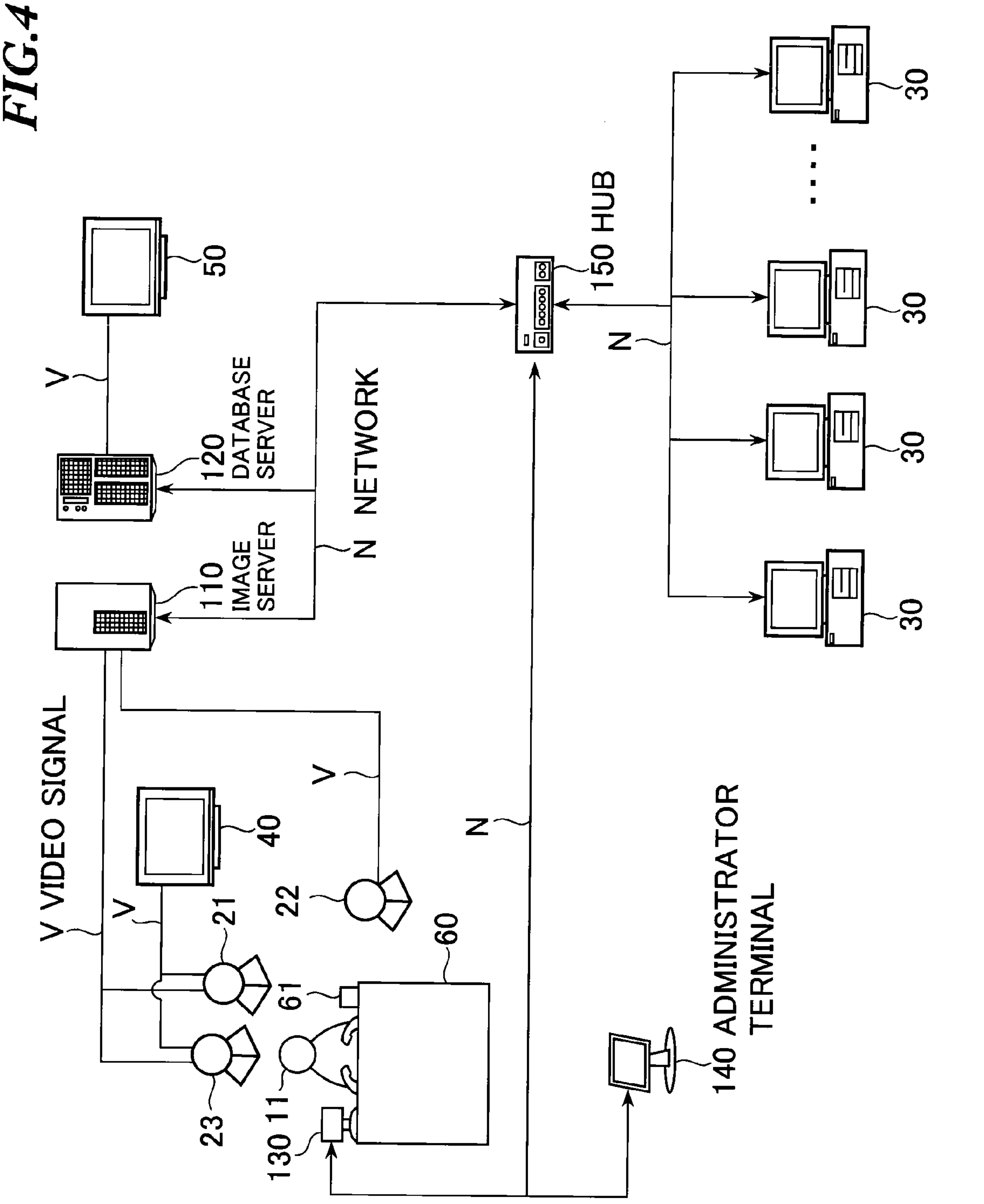
FIG. 4 is an exemplary system configuration diagram of the baccarat game system.

Next, referring to FIG. 4, a description is given of a system configuration of the baccarat game system in this embodiment.

110 shown in FIG. 4 denotes an image server that delivers the card images captured by the fixed card image capturing camera 21, the shoe image captured by the fixed shoe image capturing camera 22, and the card images and the shoe image captured by the movable capturing cameras 23. It should be noted that, as a general rule, the image server 110 delivers the card images and the shoe image to the player terminals 30 on a real-time basis.

Additionally, 120 denotes a database server that includes a RAM (memory device) and a ROM that can store the BET information that is input by the game player 12, game result information that is input by the dealer 11, personal information such as the dividend information, and the like, and a CPU (central processing unit) that can calculate the dividend information of the game player 12 from the BET information and the game results, and create the baccarat result table from the game results.

130 denotes a dealer terminal that can be operated only by the dealer 11, and is formed by, for example, a PC (personal computer) including a CPU (central processing unit), a ROM, and a RAM (memory device). The dealer terminal 130 allows an input of the game results and the face values of the cards, and also allows an operation required for proceeding the game, such as closing of betting.

140 denotes an administrator terminal that can be operated only by an administrator, who is not shown, and is formed by, for example, a PC (personal computer) as in the dealer terminal 130. The administrator terminal 140 allows administrative operations, such as interruption in the case where a system trouble occurs, and correction of game result inputs by the dealer 11.

As shown in FIG. 4, the player terminals 30, the dealer terminal 130, and the administrator terminal 140 are connected to each other via a network N and a hub 150. The fixed card image capturing camera 21 and the movable capturing cameras 23 are connected by wiring to the large screen 40 and the image server 110. The fixed shoe image capturing camera 22 is connected by wiring to the image server 110. The large screen 50 is connected by wiring to the database server 120.

In the baccarat game system configured as described above, the cards C in the baccarat game that is actually performed are captured by the fixed card image capturing camera 21, and the card images are transmitted to the large screen 40 as video signals V, thereby displaying the card images on a real-time basis. Additionally, at the same time, the card images are transmitted from the fixed card image capturing camera 21 or the movable capturing cameras 23 to the image server 110 as the video signals V, and also to each of the player terminals 30, the dealer terminal 130, and the administrator terminal 140 via the network N and the hub 150, thereby displaying the status (the card images) of the baccarat game. Namely, in this embodiment, the image of the game performed on the dealer's game table 60 is captured, and displayed on the player terminals 30 on the game player tables 70 and the like on a real-time basis. It is preferable that the card images captured then is a moving image. However, the card images may be consecutive still images.

Further, in this embodiment, the fixed shoe image capturing camera 22 for capturing the status of the shoe 61, which holds unused cards, and the movable capturing cameras 23 are provided. The images captured by these cameras are transmitted to the image server 110 as the video signals V, and displayed as the shoe image on each of the player terminals 30, the dealer terminal 130, and the administrator terminal 140 via the network N and the hub 150 on a real-time basis.

In addition, the BET information that is input from the player terminals 30 by the game players 12 is transmitted to the database server 120 via the network N and the hub 150, and stored in the database server 120.

The player terminals 30 receive the game results that are input from the dealer terminal 130 via the database server 120, and display the game results. Additionally, the player terminals 30 receive the dividend information calculated by the database server 120, and receive dividends as electronic information in case of win.

It should be noted that the history of the BET information, the history of the dividend information and the like of each of the game players 12 are gathered in the player terminal the player terminals 30 and the database server 120. A house can use the gathered information when, for example, providing the gathered information to the game players 12 as scores, and offering services in accordance with the BET information of the game players 12.

Next, referring to FIG. 5 through FIG. 10, a description is given of an exemplary operation of the baccarat game system according to this embodiment.

(Administrator Terminal Control)

Figure 5:
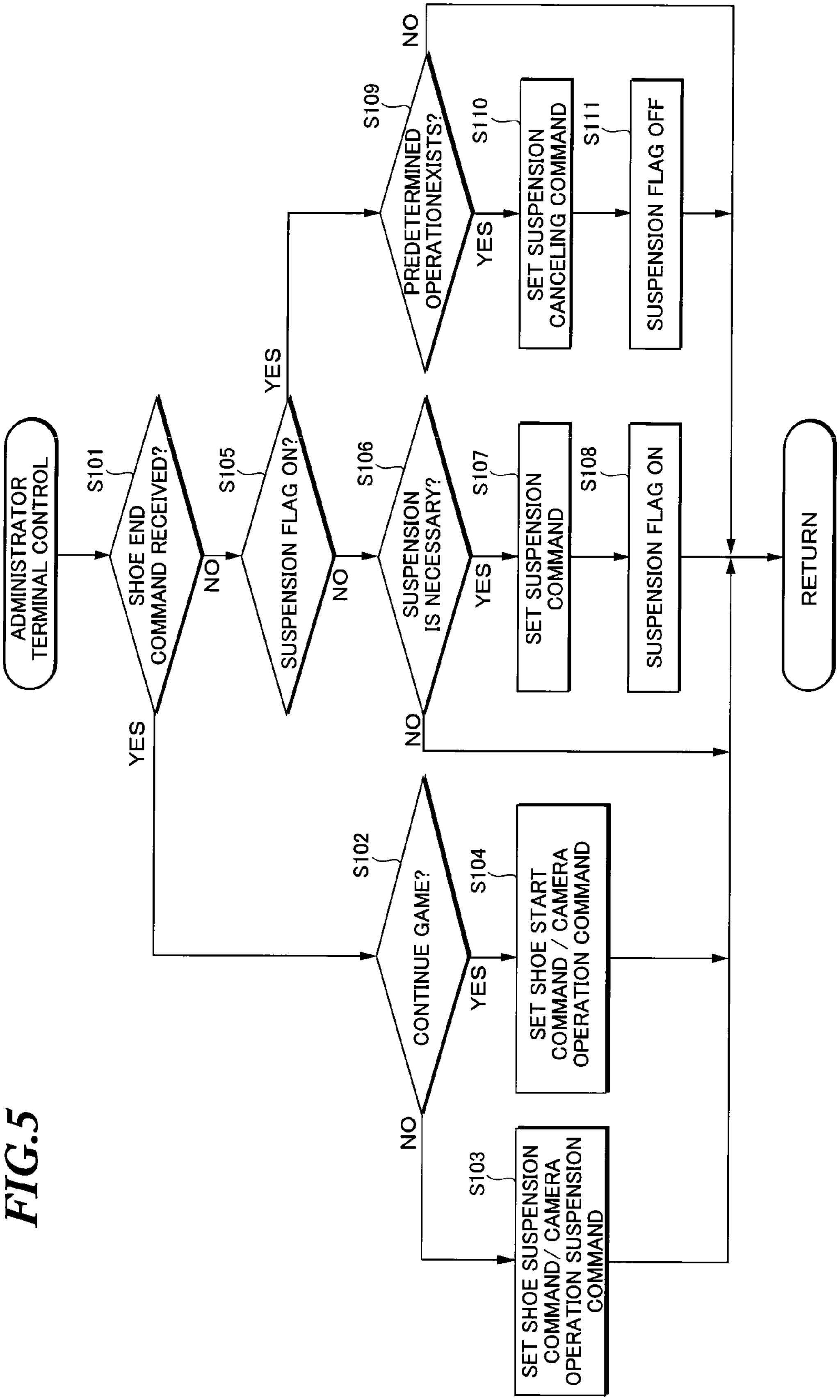
FIG. 5 is an exemplary flowchart showing a control process in an administrator terminal.
Figure 10:
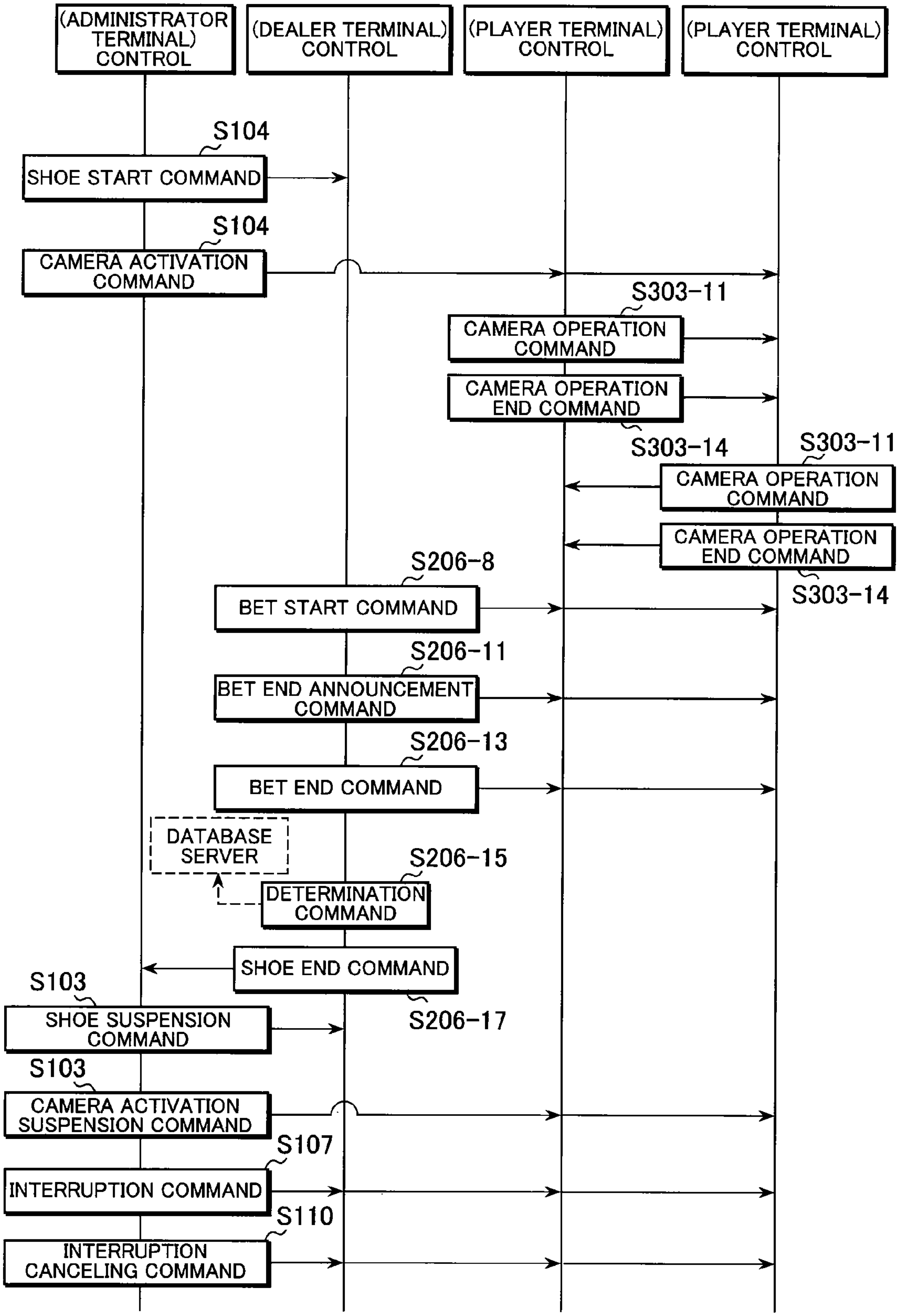
FIG. 10 is an exemplary diagram showing a relationship of transmission/reception of commands among the administrator terminal, the dealer terminal, and the player terminal.

Referring to FIG. 5 and FIG. 10, a description is given of an exemplary control process in the administrator terminal 140.

(Step S101)

A CPU forming the administrator terminal 140 (hereinafter referred to as "the administrator terminal CPU") first determines, in step S101, whether or not a shoe end command transmitted from the dealer terminal 130 is received. The shoe end command is set in step S206-17 in a shoe process by the dealer terminal 130, which is described later. The shoe end command is the command that is transmitted to the administrator terminal 140 when the dealer 11 operates the dealer terminal 130 in the case where the cards C set in the shoe 61 are all pulled out.

When the administrator terminal CPU receives the shoe end command, the process proceeds to step S102, and when the administrator terminal CPU does not receive the shoe end command, the process proceeds to step S105.

(Step S102)

In step S102, the administrator terminal CPU determines whether or not to continue the game, that is, whether the administrator permits the dealer 11 to set new cards C to the shoe 61. Such permission can be made by operating a keyboard or the like of the administrator terminal 140.

When the administrator terminal CPU does not make the permission as described above, the process proceeds to step S103, and when the administrator terminal CPU makes the permission, the process proceeds to step S104.

(Step S103)

In step S103, the administrator terminal CPU transmits a shoe suspension command to the dealer terminal 130, and also transmits a camera operation suspension command to the player terminals 30.

As described later, when the shoe suspension command is received, the dealer terminal 130 suspends the proceeding of the subsequent baccarat game (step S206-1). Additionally, the player terminals 30 cannot perform an operation of the movable capturing cameras 23 when the camera operation suspension command is received (step S303-1).

After performing the process of step S103, the administrator terminal CPU ends the control process in the administrator terminal 140.

(Step S104)

In step S104, the administrator terminal CPU performs a process of transmitting a shoe start command to the dealer terminal 130, and also transmitting a camera operation command to the player terminals 30.

As described later, when the shoe start command is received, the dealer terminal 130 can perform the subsequent process (step S206-5) in a shoe process (S206). Additionally, the player terminals 30 can perform an operation of the movable capturing cameras 23 when the camera operation command is received (step S303-3).

After performing the process of step S104, the administrator terminal CPU ends the control process in the administrator terminal 140.

(Step S105)

In step S105, the administrator terminal CPU determines whether or not a suspension flag is set in a memory area (hereinafter referred to as "the administrator terminal memory area") of a RAM or the like of the administrator terminal 140. The suspension flag is set in step S108, which is described later. The suspension flag is set when the administrator determines that it is necessary to suspend the proceeding of the baccarat game in the case where, for example, the dealer 11 commits fraud.

When the administrator terminal CPU determines that the suspension flag is not set, the process proceeds to step S106, and when the administrator terminal CPU determines that the suspension flag is set, the process proceeds to step S109.

(Step S106)

In Step S106, the administrator terminal CPU determines whether or not suspension is necessary, more specifically, whether or not predetermined information is input by operating the keyboard or the like of the administrator terminal 140 in the case where the administrator determines that it is necessary to suspend the proceeding of the game. In this embodiment, such an operation of suspension is made when, for example, the game player 12 operates the movement of the movable capturing camera 23, finds fraud by the dealer 11, and reports the fraud.

When the administrator terminal CPU determines that the above-described input is made, the process proceeds to step S107, and when the administrator terminal CPU determines that the input is not made, the administrator terminal CPU ends the control process in the administrator terminal 140.

(Step S107)

In Step S107, the administrator terminal CPU performs a process of transmitting a suspension command to the player terminals 30 and the dealer terminal 130.

As described later, when the player terminals 30 and the dealer terminal 130 receive the suspension command, a message such as "Please wait for a moment" is displayed on respective display devices. While such a message is displayed, an operation related to the baccarat game is disabled.

After the administrator terminal CPU performs the process of step S107, the process proceeds to step S108.

(Step S108)

In step S108, the administrator terminal CPU performs a process of setting the suspension flag in the administrator terminal memory area, and thereafter ends the control process in the administrator terminal 140.

(Step S109)

In step S109, the administrator terminal CPU determines whether or not a predetermined operation is performed for canceling the suspension flag (canceling a suspended state) that is set in the administrator terminal memory area, for example, whether or not predetermined information is input by operating the keyboard or the like of the administrator terminal 140. In this embodiment, such an operation of canceling the suspension state is performed after, for example, the administrator confirms fraud, when the game player 12 reports the fraud by the dealer 11, and the game is suspended.

When the administrator terminal CPU determines that the predetermined information is input, the process proceeds to step S110, and when the administrator terminal CPU determines that the predetermined information is not input, the administrator terminal CPU ends the control process in the administrator terminal 140.

(Step S110)

In step S110, the administrator terminal CPU performs a process of transmitting a suspension canceling command to the player terminals 30 and the dealer terminal 130.

As described later, when the player terminals 30 and the dealer terminal 130 receive the suspension canceling command, a message such as "You can play game" is displayed on the respective display devices, and an operation of the dealer terminal 130 that has been disabled is enabled.

After the administrator terminal CPU performs the process of step S110, the process proceeds to step S111.

(Step S111)

In Step S111, the administrator terminal CPU performs a process of turning OFF the suspension flag that is set in the administrator terminal memory area, and thereafter ends the control process in the administrator terminal 140.

(Dealer Terminal Control)

Figure 6:
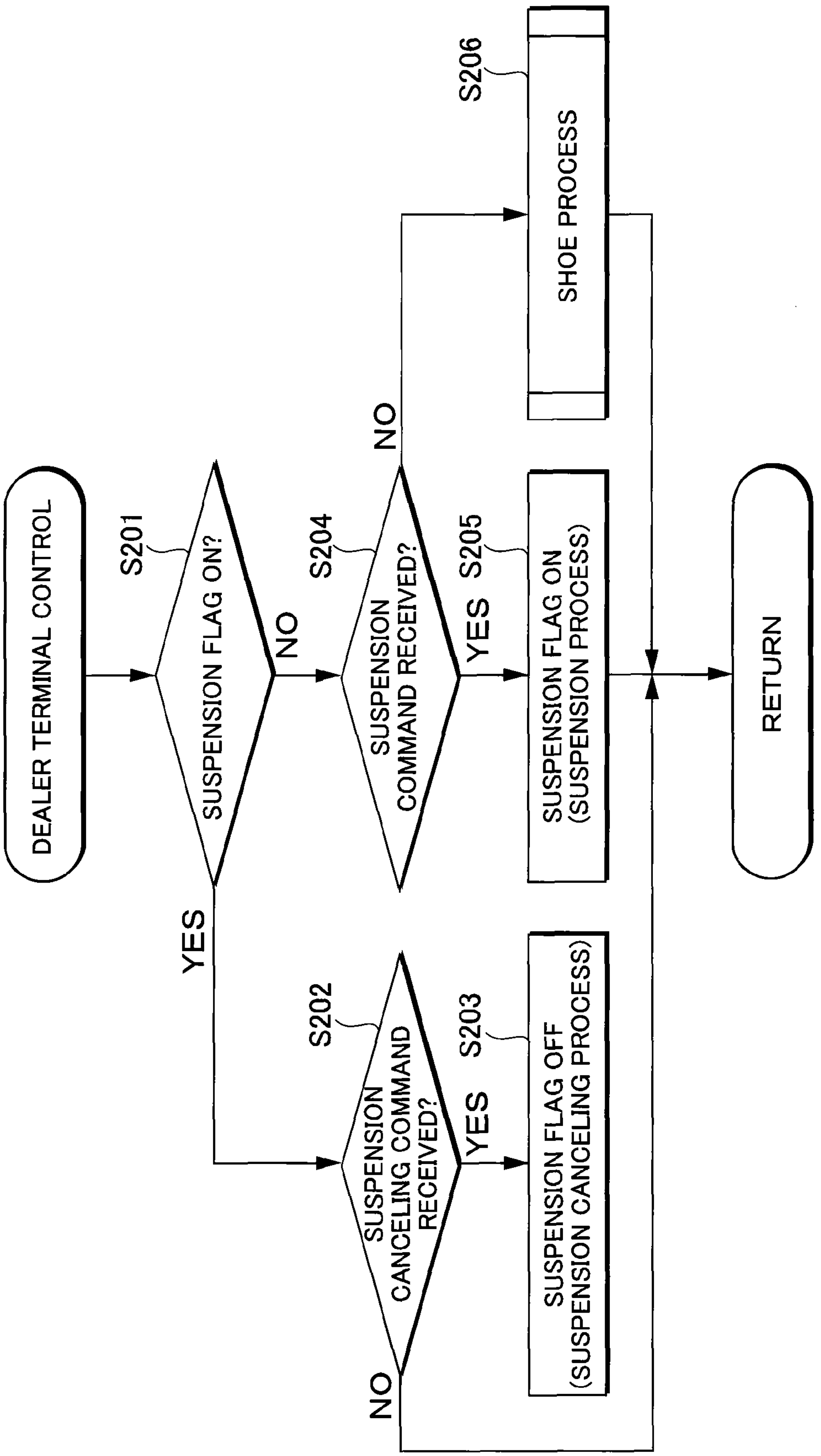
FIG. 6 is an exemplary flowchart showing a control process in a dealer terminal.

Next, referring to FIG. 6 and FIG. 10, a description is given of an exemplary control process in the dealer terminal 130.

(Step S201)

First, in step S201, a CPU forming the dealer terminal 130 (hereinafter referred to as "the dealer terminal CPU") determines whether or not the suspension flag is set in a memory area (hereinafter referred to as "the dealer terminal memory area") of a RAM or the like of the dealer terminal 130. The suspension flag is set in step S205, which is described later, when the suspension command transmitted from the administrator terminal 140 is received. In this embodiment, while the suspension flag is set in the dealer terminal memory area, an operation of the dealer terminal 130 is disabled, that is, proceeding of the baccarat game is suspended.

When the dealer terminal CPU determines that the suspension flag is set, the process proceeds to step S202, and when the dealer terminal CPU determines that the suspension flag is not set, the process proceeds to step S204.

(Step S202)

In step S202, the dealer terminal CPU determines whether or not the suspension canceling command transmitted from the administrator terminal 140 is received. The suspension canceling command is transmitted in the process of step S110 in the administrator terminal control.

When the dealer terminal CPU determines that the suspension canceling command is received, the process proceeds to step S203, and when the dealer terminal CPU determines that the suspension canceling command is not received, the dealer terminal CPU ends the control process in the dealer terminal 130.

(Step S203)

In step S203, the dealer terminal CPU performs a process of turning OFF the suspension flag that is set to the dealer terminal memory area (suspension canceling process). With this process, a message such as "You can play game" is displayed on the display device of the dealer terminal 130, and an operation of the dealer terminal 130 that has been disabled is enabled, that is, it becomes possible to resume the baccarat game that has been suspended.

After the dealer terminal CPU performs the suspension canceling process, the dealer terminal CPU ends the control process in the dealer terminal 130.

(Step S204)

In step S204, the dealer terminal CPU determines whether or not the suspension command transmitted from the administrator terminal 140 is received. The suspension command is transmitted in step S107 in the control process in the administrator terminal 140.

When the dealer terminal CPU determines that the suspension command is received, the process proceeds to step S205, and when the dealer terminal CPU determines that the suspension command is not received, the process proceeds to step S206.

(Step S205)

In step S205, the dealer terminal CPU performs a process of setting the suspension command in the dealer terminal memory area (suspension process). With this process, a message such as "Please wait" is displayed on the display device of the dealer terminal 130, and an operation of the dealer terminal 130 that has been enabled is disabled, that is, the proceeding of the baccarat game is suspended until the suspension flag is turned OFF in step S203.

After the dealer terminal CPU performs the suspension process, the dealer terminal CPU ends the control process in the dealer terminal 130.

(Step S206)

In step S206, the dealer terminal CPU performs a shoe process. The shoe process is described later in detail with reference to FIG. 7.

After the dealer terminal CPU performs the shoe process, the dealer terminal CPU ends the control process in the dealer terminal 130.

(Shoe Process)

Figure 7:
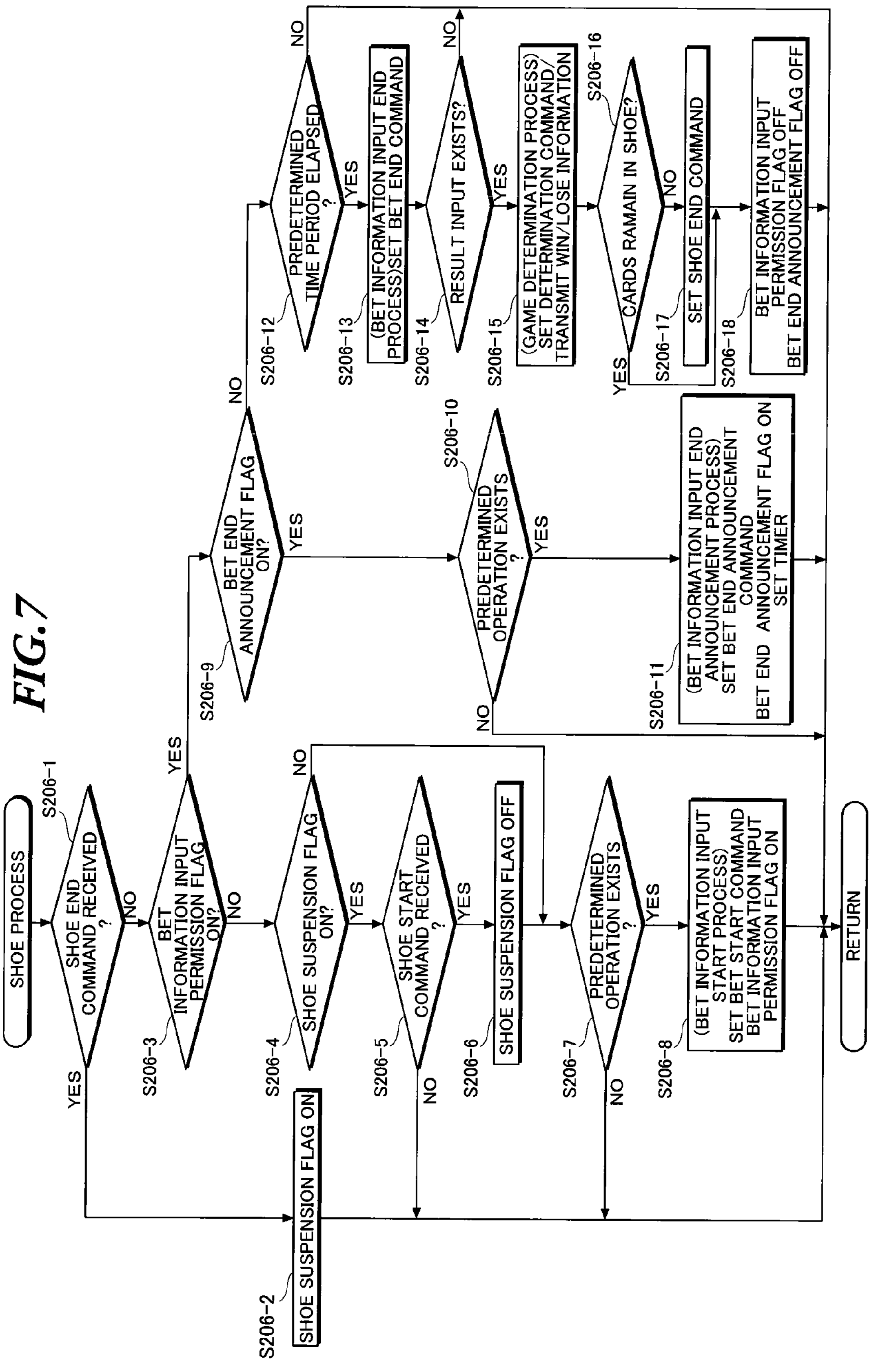
FIG. 7 is an exemplary flowchart showing a shoe process in the dealer terminal.

Next, referring to FIG. 7 and FIG. 10, a description is given of the shoe process in the dealer terminal 130.

(Step S206-1)

First, in step S206-1, the dealer terminal CPU determines whether or not the shoe suspension command transmitted from the administrator terminal 140 is received. The shoe suspension command is transmitted in the process of step S103 in the control process in the administrator terminal 140.

When the dealer terminal CPU determines that the shoe suspension command is received, the process proceeds to step S206-2, and when the dealer terminal CPU determines that the shoe suspension command is not received, the process proceeds to step S206-3.

(Step S206-2)

In step S206-2, the dealer terminal CPU performs a process of setting a shoe suspension flag in the dealer terminal memory area. In a state where the shoe suspension flag is set, an operation of the dealer terminal 130 is disabled, that is, the proceeding of the baccarat game is suspended. It should be noted that, once the shoe suspension flag is set, the state is maintained until the shoe suspension flag is turned OFF in step S206-6, which is described later, that is, until the shoe start command transmitted from the administrator terminal 140 is received.

After the dealer terminal CPU performs the process of setting the shoe suspension flag, the dealer terminal CPU ends the shoe process.

(Step S206-3)

In step S206-3, the dealer terminal CPU determines whether or not a BET information input permission flag is set in the dealer terminal memory area. The BET information input permission flag is set in the dealer terminal memory area in step S206-8, which is described later.

When the dealer terminal CPU determines that the BET information input permission flag is not set, the process proceeds to step S206-4, and when the dealer terminal CPU determines that the BET information input permission flag is set, the process proceeds to step S206-9.

(Step S206-4)

In step S206-4, the dealer terminal CPU determines whether or not the shoe suspension flag is set in the dealer terminal memory area. The shoe suspension flag is set in the dealer terminal memory area in the process of step S206-2.

(Step S206-4)

When the dealer terminal CPU determines that the shoe suspension flag is set, the process proceeds to step S206-5, and when the dealer terminal CPU determines that the shoe suspension flag is not set, the process proceeds to step S206-7.

(Step S206-5)

In step S206-5, the dealer terminal CPU determines whether or not the shoe start command transmitted from the administrator terminal 140 is received. The shoe start command is transmitted in the process of step S104 in the control process of the administrator terminal 140.

When the dealer terminal CPU determines that the shoe start command is received, the process proceeds to step S206-6, and when the dealer terminal CPU determines that the shoe start command is not received, the dealer terminal CPU ends the shoe process.

(Step S206-6)

In step S206-6, the dealer terminal CPU performs a process of turning OFF the shoe end flag that is set in the dealer terminal memory area. With this process, a message such as "You can play game" is displayed on the display device of the dealer terminal 130, and it becomes possible for the dealer 11 to shuffle six or eight pairs of playing cards well and set them to shoe 61.

After the dealer terminal CPU performs the process of turning OFF the shoe suspension flag, the process proceeds to step S206-7.

(Step S206-7)

In step S206-7, the dealer terminal CPU determines whether or not the dealer 11 inputs predetermined information by operating a keyboard or the like of the dealer terminal 130. Such an operation is performed at the timing when, in the case where all of the cards C in the shoe 61 are pulled out ("YES" in the process of step S206-4), the dealer 11 sets the cards C to the shoe 61, it becomes possible to play the baccarat game with the new cards C, and at the timing when, in the case where the baccarat game is continued in a state where the cards C remain in the shoe 61 ("NO" in the process of step S206-4), it becomes possible to play the baccarat game by using the cards C that are already set in the shoe 61.

When the dealer terminal 130 determines that the dealer 11 inputs the predetermined information, the process proceeds to step S206-8, and when the dealer terminal 130 determines that the dealer 11 does not input the predetermined information, the dealer terminal 130 ends the shoe process.

(Step S206-8)

In step S206-8, the dealer terminal CPU performs a process of transmitting a BET start command to the player terminals 30, and setting the BET information input permission flag to the dealer terminal memory area (BET information input start process).

With the BET information input start process, a message such as "Accepting BETs" is displayed on the respective display devices of the dealer terminal 130 and the player terminals 30, and it becomes possible for the game players 12 to input the BET information from the player terminals 30. It should be noted that, in this embodiment, as described above, the BET information that is input by the game players 12 and win/lose information that is input by the dealer 11 in step S206-15, which is described later, are transmitted to the database server 120.

After the dealer terminal CPU performs the BET information input start process, the dealer terminal CPU ends the shoe process.

(Step S206-9)

In step S206-9, the dealer terminal CPU determines whether or not a BET end announcement flag is set in the dealer terminal memory area. The BET end announcement flag is set in the dealer terminal memory area in step S206-11, which is described later.

When the dealer terminal CPU determines that the BET end announcement flag is set, the process proceeds to step S206-10, and when the dealer terminal CPU determines that the BET end announcement flag is not set, the process proceeds to step S206-12.

(Step S206-10)

In step S206-10, the dealer terminal CPU determines whether or not the dealer 11 inputs predetermined information by operating the keyboard or the like of the dealer terminal 130. Such an operation is performed at the timing when, for example, the dealer 11 observes the status of the BETs by the game players 12, and determines that inputting of the BET information by the game players 12 is almost done.

When the dealer terminal CPU determines that the predetermined information is input, the process proceeds to step S206-11, and when the dealer terminal CPU determines that the predetermined information is not input, the dealer terminal CPU ends the shoe process.

(Step S206-11)

In step S206-11, the dealer terminal CPU performs a process of transmitting a BET end announcement command to the player terminals 30, and setting a BET end announcement flag in the dealer terminal memory area. Additionally, at the same timing of this process, the dealer terminal CPU performs a process of starting timing using a timer, which is provided in the dealer terminal 130 (BET information input end announcement process).

With the BET information input end announcement process, a countdown display such as "00 seconds until BET is closed" is displayed according to the timing using the timer on the respective display devices of the dealer terminal 130 and the player terminals 30.

After the dealer terminal CPU performs the BET information input end announcement process, the dealer terminal CPU ends the shoe process.

(Step S206-12)

In step S206-12, the dealer terminal CPU determines whether or not the time measured by the timer that is set by the process in step S206-11 has elapsed a predetermined time period (for example, 10 seconds).

When the dealer terminal CPU determines that the predetermined time period has elapsed, the process proceeds to step S206-13, and when the dealer terminal CPU determines that the predetermined time period has not elapsed, the shoe process ends.

(Step S206-13)

In step S206-13, the dealer terminal CPU performs a process of transmitting the BET end announcement command to the player terminals 30 (BET information input end process).

By the BET information input end process, a message of "BET reception end" is displayed on the respective display devices of the dealer terminal 130 and the player terminals 30, and the game players cannot input BET information in the ongoing baccarat game. After this process, the dealer 11 picks cards from the shoe 61, deals cards to the Banker and the Player, and opens the cards so as to determine the result of the game.

After the dealer terminal CPU performs the BET information input end process, the process proceeds to step S206-14.

(Step S206-14)

In step S206-14, the dealer terminal CPU determines whether or not win/lose information is input by operating the keyboard or the like of the dealer terminal 130. The win/lose information includes the card faces of the Banker hand and the Player hand, the result of the game, that is, Banker win, Player win or Tie, and the like.

When the dealer terminal CPU determines that the win/lose information is input, the process proceeds to step S206-15, and when the dealer terminal CPU determines that the win/lose information is not input, the dealer terminal CPU ends the shoe process.

(Step S206-15)

In step S206-15, the dealer terminal CPU performs a process of transmitting a determination command and the win/lose information to the database server 120 (game determination process).

Based on the BET information which is input by the game player 12 and the win/lose information which is input by the dealer 11, the database server 120 calculates dividend for each of the player terminals. The calculated dividend information is transmitted to the corresponding player terminal 30 (the player terminal 30 of the game player who has correctly predicted the result).

The win/lose information (indication that the prediction of the result was correct) and the dividend information, which are transmitted from the database server 120, are displayed on the display device of the player terminal 30 of the game player who has correctly predicted the result. On the other hand, the win/lose information (indication that the prediction of the result was incorrect), which is transmitted from the database server 120, is displayed on the player terminal 30 of the game player who has incorrectly predicted the result.

After the dealer terminal CPU performs the above-described process, the process proceeds to step S206-16.

(Step S206-16)

In Step S206-16, the dealer terminal CPU determines whether or not the cards C remain in the shoe 61. In this embodiment, the dealer terminal CPU determines whether or not information related to whether or not there are cards is input by the dealer 11 by operating the keyboard or the like of the dealer terminal 130.

When the dealer terminal CPU determines that no card remains in the shoe 61, the process proceeds to step S206-17, and when the dealer terminal CPU determines that the cards C remain in the shoe 61, the process proceeds to step S206-18.

(Step S206-17)

In Step S206-17, the dealer terminal CPU performs a process of transmitting a shoe end command to the administrator terminal 140.

After performing the above-described process, the dealer terminal CPU moves the process to step S206-18.

(Step S206-18)

In Step S206-18, the dealer terminal CPU performs a process of setting OFF each of the BET information input accepting flag and the BET end announcement flag which are set in the dealer terminal memory area.

After performing the above-described process, the dealer terminal CPU ends the shoe process.

(Player Terminal Control)

Figure 8:
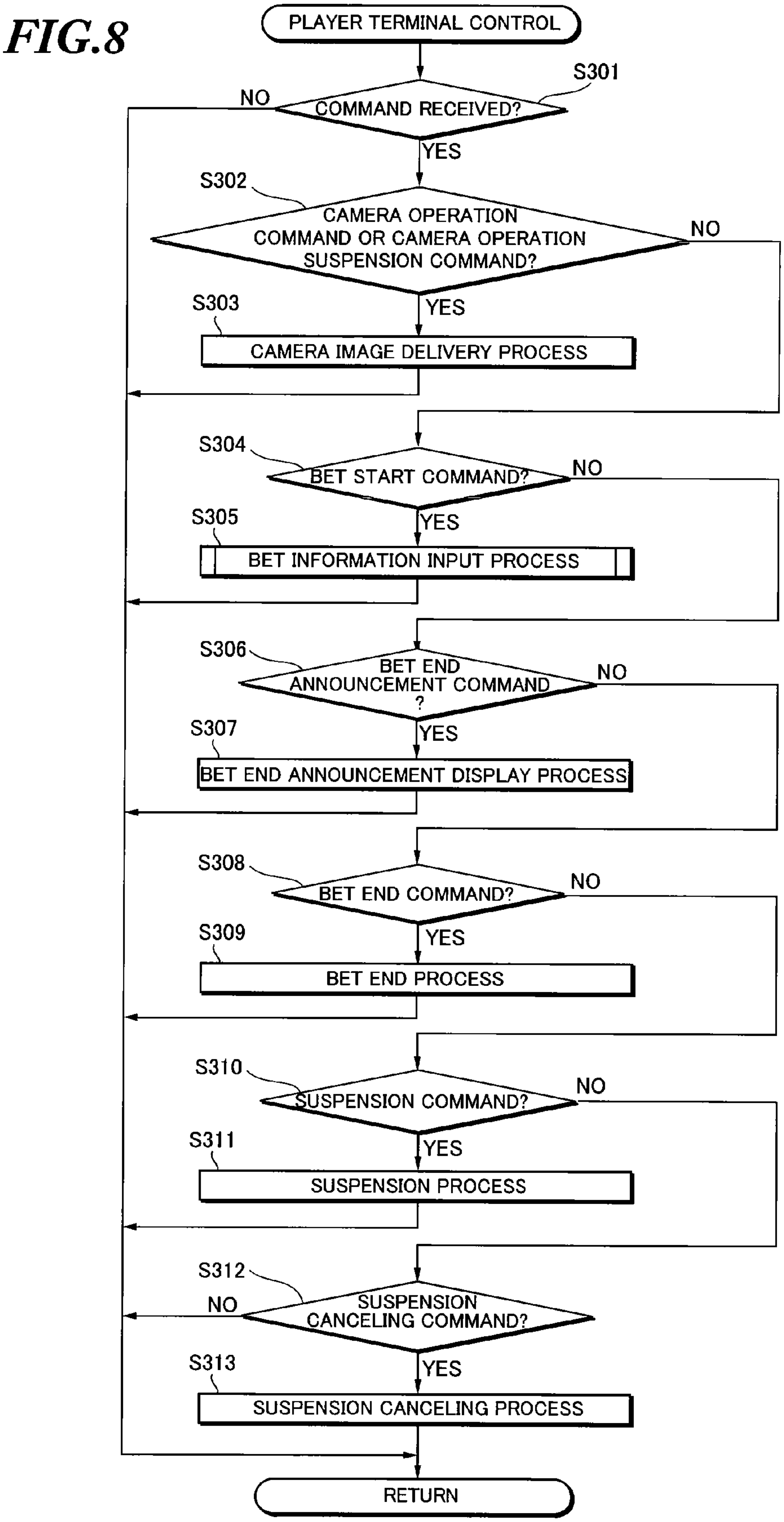
FIG. 8 is an exemplary flowchart showing a control process in a player terminal.
Figure 9:
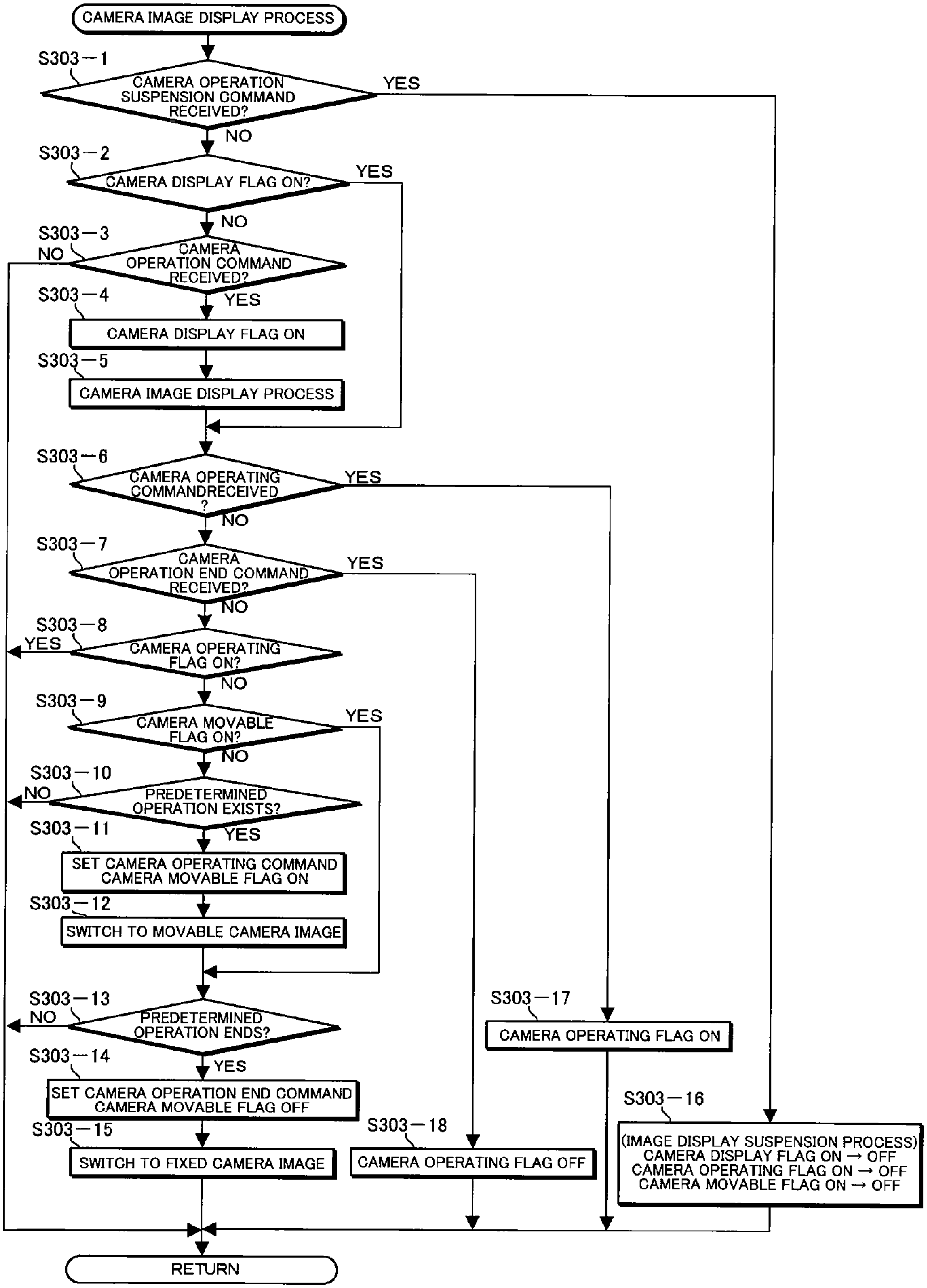
FIG. 9 is an exemplary flowchart showing a camera image display process in the player terminal.

Next, referring to FIG. 8 and FIG. 10, a description is given of an exemplary control process in the player terminal 30.

(Step S301)

First, in step S301, the CPU forming the player terminal 30 (hereinafter referred to as "the player terminal CPU") determines whether or not a command transmitted from the dealer terminal 130 or the administrator terminal 140 is received.

When the command is received, the player terminal CPU moves the process to step S302, and when the command is not received, the player terminal CPU ends the control process in the player terminal 30.

(Step S302)

In step S302, the player terminal CPU determines whether the received command is the camera operation command or the camera operation suspension command transmitted from the administrator terminal. The camera operation command is the command transmitted in step S104 in the control process by the administrator terminal 140, when there is no card C in the shoe 61, and when the administrator allows the dealer 2 to set the cards C to the shoe 61 (step S102). On the other hand, the camera operation suspension command is the command transmitted in step S103 in the control process by the administrator terminal 140, when there is no card C in the shoe 61, and when the administrator does not allow the dealer 2 to set the cards C to the shoe 61 (step S102).

When the camera operation command or the camera operation suspension command is received, the player terminal CPU moves the process to step S303. When the camera operation command or the camera operation suspension command is not received, the player terminal CPU moves the process to step S304.

(Step S303)

In step S303, the player terminal CPU performs the camera image display process. The camera image display process will be described later in detail with reference to FIG. 9.

After performing the camera image display process, the player terminal CPU ends the control process in the player terminal 30.

(Step S304)

In step S304, the player terminal CPU determines whether or not the received command is the BET start command transmitted from the dealer terminal 130. The BET start command is the command transmitted in step S206-8 of the shoe process by the dealer terminal 130.

When the BET start command is received, the player terminal CPU moves the process to step S305, and when the BET start command is not received, the player terminal CPU moves the process to step S306.

(Step S305)

In step S305, the player terminal CPU performs a BET information input process. In the BET information input process, a process is performed which displays, on the BET screen display region 33 of the player terminal 30, a message for prompting the game player 12 to input the BET information, such as "Please place a BET". After the message is displayed, the game player 12 can input the BET information by touching the BET screen display region 33 by a finger or the like, until the message "BET reception end" is displayed on the display device in a BET end process in step S309, which is described later.

After the player terminal CPU performs the BET information input process, the player terminal CPU ends the control process in the player terminal 30.

(Step S306)

In step S306, the player terminal CPU determines whether or not the received command is the BET end announcement command transmitted from the dealer terminal 130. The BET end announcement command is the command transmitted in step S206-11 in the shoe process in the dealer terminal 130.

When the player terminal CPU determines that the received command is the BET end announcement command, the process proceeds to step S307, and when the player terminal CPU determines that the received command is not the BET end announcement command, the process proceeds to step S308.

(Step S307)

In step S307, the player terminal CPU performs a BET end announcement display process. In the BET end announcement display process, a process is performed that displays, on the BET screen display region 33 of the player terminal 30, a remaining time until BET is closed, such as "00 seconds until BET is closed", in a count-down manner.

After the player terminal CPU performs the BET end announcement display process, the player terminal CPU ends the control process in the player terminals 30.

(Step S308)

In step S308, the player terminal CPU determines whether or not the received command is the BET end command transmitted from the dealer terminal 130. The BET end command is the command transmitted in step S206-13 in the shoe process in the dealer terminal 130.

When the player terminal CPU determines that the received command is the BET end command, the process proceeds to step S309, and when the player terminal CPU determines that the received command is not the BET end command, the process proceeds to step S310.

(Step S309)

In step S309, the player terminal CPU performs the BET end process. In the BET end process, a process is performed that displays, on the BET screen display region 33 of the player terminal 30, a message indicating that betting is closed, such as "BET is closed, and disables the input of the BET information even when the game player 12 touches the BET screen display region 33 with a finger or the like.

After the player terminal CPU performs the BET end process, the player terminal CPU ends the control process in the player terminals 30.

(Step S310)

In step S310, the player terminal CPU determines whether or not the received command is the suspension command transmitted from the administrator terminal 140. The suspension command is a command transmitted in step S107 in the control process in the administrator terminal 140.

When the player terminal CPU determines that the received command is the suspension command, the process proceeds to step S311, and when the player terminal CPU determines that the received command is not the suspension command, the process proceeds to step S312.

(Step S311)

In step S311, the player terminal CPU performs the suspension process. In the suspension process, a process is performed that displays, on the BET screen display region 33 of the player terminal 30, a message such as "Please wait for a moment", and while the message is displayed, disables the operation of movement of the movable capturing camera 23 as well as the input of the BET information, even when the game player 12 touches the BET screen display region 33 with a finger or the like.

After the player terminal CPU performs the suspension process, the player terminal CPU ends the control process in the player terminal 30.

(Step S312)

In step S312, the player terminal CPU determines whether or not the received command is the suspension canceling command transmitted from the administrator terminal 140. The suspension canceling command is the command transmitted in step S110 in the control process in the administrator terminal 140.

When the player terminal CPU determines that the received command is the suspension canceling command, the process proceeds to step S313, and when the player terminal CPU determines that the received command is not the suspension canceling command, the player terminal CPU ends the control process in the player terminal 30.

(Step S313)

In step S313, the player terminal CPU performs the suspension canceling process. In the suspension canceling process, a process is performed that resumes the proceeding of the baccarat game that has been suspended by the process in step S311. Specifically, a process is performed that displays, on the BET screen display region 33 of the player terminal 30, a message such as "You can play game", and enables the input of the BET information, the input of the operation of movement of the movable capturing camera 23, and the like, which have been disabled until then.

After the player terminal CPU performs the suspension process, the player terminal CPU ends the control process in the player terminal 30.

(Camera Image Display Process)

Next, referring to FIG. 1, FIG. 3, FIG. 9 and FIG. 10, a description is given of an exemplary camera image display process in the player terminal 30.

(Step S303-1)

In step S303-1, the player terminal CPU determines whether or not the camera operation suspension command transmitted from the administrator terminal 140 is received. As described above, the camera operation suspension command is the command transmitted in step S104 in the control process in the administrator terminal 140.

When the player terminal CPU determines that the camera operation suspension command is not received, the process proceeds to step S303-2, and when the player terminal CPU determines that the camera operation suspension command is received, the process proceeds to step S303-16.

(Step S303-2)

In step S303-2, the player terminal CPU determines whether or not a camera display flag is set in a memory area (hereinafter referred to as "the player terminal memory area") of a RAM or the like of the player terminal 30. The camera display flag is the flag that is set in the player terminal memory area in the process of step S303-4, which is described later, when the camera operation command transmitted from the administrator terminal 140 is received, and is turned OFF when the camera operation suspension command transmitted from the administrator terminal 140 is received (step S303-16).

When the player terminal CPU determines that the camera display flag is not set, the process proceeds to step S303, and when the player terminal CPU determines that the camera display flag is set, the process proceeds to step S303-6.

(Step S303-3)

In step S303-3, the player terminal CPU determines whether or not the camera operation command transmitted from the administrator terminal 140 is received. As described above, the camera operation command is the command transmitted in step S103 in the control process in the administrator terminal 140.

When the player terminal CPU determines that the camera operation command is received, the process proceeds to step S303-4, and when the player terminal CPU determines that the camera operation command is not received, the player terminal CPU ends the camera image display process.

(Step S303-4)

In step S303-4, the player terminal CPU performs a process of setting the camera display flag in the player terminal memory area, and thereafter the process proceeds to step S303-5.

(Step S303-5)

In step S303-5, the player terminal CPU performs a process of displaying, on the main screen display region 31, the card images captured by the fixed card image capturing camera 21, and displaying, on the subscreen display region 32, the shoe image captured by the fixed shoe image capturing camera 22 (fixed camera image display process).

After the player terminal CPU performs the fixed camera image display process, the process proceeds to step S303-6.

(Step S303-6)

In step S303-6, the player terminal CPU determines whether or not a camera operating command is received. When one of the four player terminals 30 constituting the same row (the front row F, the intermediate row M, the end row R) starts using of the movable capturing camera 23 in step S303-11, which is described later, the camera operating command is transmitted from this player terminal 30 to the other three the player terminals 30.

When the player terminal CPU determines that the camera operating command is not received, the process proceeds to step S303-7, and when the player terminal CPU determines that the camera operating command is received, the process proceeds to step S303-17.

(Step S303-7)

In step S303-7, the player terminal CPU determines whether or not a camera operation end command is received. When the above-described one of the four player terminals 30 stops using of the movable capturing camera 23 in step S303-14, which is described later, the camera operation end command is transmitted from this player terminal 30 to the other three the player terminals 30.

When the player terminal CPU determines that the camera operation end command is not received, the process proceeds to step S303-8, and when the player terminal CPU determines that the camera operation end command is received, the process proceeds to step S303-18.

(Step S303-8)

In step S303-8, the player terminal CPU determines whether or not the camera operating flag is set in the player terminal memory area. When the above-described one of the four player terminals 30 is using the movable capturing camera 23, the camera operating flag is set in the player terminal memory areas of the other three player terminals 30 in step S303-17, which is described later.

When the player terminal CPU determines that the camera operating flag is not set, the process proceeds to step S303-9, and when the player terminal CPU determines that the camera operating flag is set, the player terminal CPU ends the camera image display process.

(Step S303-9)

In step S303-9, the player terminal CPU determines whether or not a camera movable flag is set in the player terminal memory area. When the above-described one of the four player terminals 30 starts using of the movable capturing camera 23, the camera movable flag is set in the player terminal memory area of this player terminal 30 in step S303-11, which is described later.

When the player terminal CPU determines that the camera movable flag is not set, the process proceeds to step S303-10, and when the player terminal CPU determines that the camera movable flag is set, the process proceeds to step S303-13.

(Step S303-10)

In step S303-10, the player terminal CPU determines whether or not the game player 12 touches the operation switch images 35 that are displayed on the BET screen display region 33.

In this embodiment, as described above, it is possible for the game player 12 to move the movable capturing camera 23 by touching the operation switch images 35. Specifically, for example, when the game player 12 using the player terminal 30 arranged in the front row F touches capturing direction operation switch images 35*a*, the game player 12 can move the movable capturing camera 23 in the left and right directions or the back and forth directions. Hence, it is possible for the game player 12 to set a desired capturing direction. Additionally, it is possible for the game player 12 to magnify or demagnify the card images and the shoe image that are captured, by touching a magnify/demagnify operation image switches 35*b*.

It is possible for only one player terminal 30 of the four player terminals 30 constituting the same row (the front row F, the intermediate row M, the end row R) to perform such an operation of moving the movable capturing camera 23, after the player terminal 30 receives the camera operation command transmitted from the administrator terminal 140 (the command transmitted when the administrator permits the dealer 11 to set the cards C to the shoe 61), until the camera operation end command (the command transmitted when the administrator does not permit the dealer 11 to set the cards C to the shoe 61) transmitted from the administrator terminal 140 is received (step S303-8).

When the player terminal CPU determines that the game player 12 touches the operation switch images 35, the process proceeds to step S303-11, when the player terminal CPU determines that the game player 12 does not touch the operation switch images 35, the player terminal CPU ends the camera image display process.

(Step S303-11)

In step S303-11, the player terminal CPU performs a process of transmitting the camera operating command from the above-described one of the four player terminals 30 to the other three player terminals 30, and setting the camera movable flag to the player terminal memory area of the one of the four player terminals 30.

After the player terminal 30 performs the above-described process, the process proceeds to step S303-12.

(Step S303-12)

In step S303-12, the player terminal CPU performs a process of displaying, on the display device of the player terminal 30, the card images or the shoe image captured by the movable capturing camera 23. Specifically, a process is performed that switches the image to be displayed on the main screen display region 31 of the display device from the card images captured by the fixed card image capturing camera 21, which are currently displayed on main screen display region 31, to the card images or the shoe image captured by the movable capturing camera 23.

In addition, since the game player 12 watches the card images or the shoe image captured by the movable capturing camera 23, the game player 12 can report to the administrator through a staff member or the like when the game player 12 finds fraud committed by the dealer 11. In such a case, depending on the judgment by the administrator, the proceeding of the casino game is suspended (step S106 to step S108, step S205, step S311).

After the player terminal CPU performs the above-described process, the process proceeds to step S303-13.

(Step S303-13)

In step S303-13, the player terminal CPU determines whether or not the game player 12 stops the operation of moving the movable capturing camera 23. It is possible to make such a determination by, for example, measuring a time period during which the game player 12 does not touch the operation switch images 35, and determining that the operation of moving is stopped when the measured time period elapses a predetermined time period.

When the player terminal CPU determines that the operation of moving is stopped, the process proceeds to step S303-14, and when the player terminal CPU determines that the operation of moving is not stopped, the player terminal CPU ends the camera image display process.

In this embodiment, it is determined in step S303-13 whether or not the game player 12 stops the operation of moving the movable capturing camera 23. However, instead of such a determination, for example, it is possible to apply a configuration that determines whether or not a predetermined time period has elapsed since the game player starts the operation of moving the movable capturing camera 23.

(Step S303-14)

In step S303-14, the player terminal CPU performs a process of transmitting the camera operation end command from the one of the four player terminals 30 to the other three player terminals 30. Hence, it is possible for each of the four player terminals 30 constituting the same row (the front row F, the intermediate row M, the end row R) to use the movable capturing camera 23.

Further, at the same time, the player terminal CPU performs a process of turning OFF the camera movable flag that is set in the player terminal memory area of the above-described one of the four player terminals 30.

After the player terminal CPU performs each of the above-described processes, the process proceeds to step S303-15.

(Step S303-15)

In step S303-15, the player terminal CPU performs a process of displaying, on the display device of the player terminal 30, the card images captured by the fixed card image capturing camera 21. Specifically, a process is performed that switches the image to be displayed on the main screen display region 31 of the display device from the card images or the shoe image captured by the movable capturing camera 23, which are currently displayed on main screen display region 31, to the card images captured by the fixed card image capturing camera 21.

After the player terminal CPU performs the above-described process, the player terminal CPU ends the camera image display process.

(Step S303-16)

When the player terminal CPU determines in the process of step S303-1 that the camera operation suspension command is received, and in the case where the camera display flag, the camera operating flag, and the camera movable flag are set in the player terminal memory area, the player terminal CPU performs a process of turning OFF each of these flags in step S303-16.

After the player terminal CPU performs the above-described process of turning OFF each of the flags, the player terminal CPU ends the camera image display process.

(Step S303-17)

When the player terminal CPU determines in the process of step S303-6 that the camera operating command is received from the above-described one of the four player terminals 30, the player terminal CPU performs a process of setting the camera operating flag in the player terminal memory area in step S303-17. Additionally, on this occasion, a message indicating that the movement of the movable capturing camera 23 is operated by the one of the four player terminals 30, such as "Camera is used", is displayed on the BET screen display regions 33 of (the other three) player terminals 30.

After the player terminal CPU sets the camera operating flag, the player terminal CPU ends the camera image display process.

(Step S303-18)

When the player terminal CPU determines in the process of step S303-7 that the camera operation end command is received from the above-described one of the four player terminals 30, the player terminal CPU performs in step S303-18 a process of turning OFF the camera operating flag that is set in the player terminal memory area.

After the player terminal CPU performs the process of turning OFF the camera operating flag, the player terminal CPU ends the camera image display process.

As described above, according to this embodiment, the game player 12 can watch the movement of the dealer 11 related to the baccarat game from every angle, by remotely operating the movable capturing camera 23. Hence, it is possible to reliably prevent fraud such as replacing of the cards C by the dealer 11.

In addition, according to this embodiment, the game player 12 can move the movable capturing camera 23 based on his/her own will. Therefore, it is possible to clear up suspicion of fraud by the dealer 11, and to play the baccarat game with satisfaction.

Additionally, in the above-described embodiment, the description is given of the baccarat game using cards as an example of the table game. However, the present invention can be applied to other card games and other table games such as roulette games in which a ball is thrown in a wheel, and dice games using a dice.

Further, in the above-described embodiment, the card images and the shoe image are both captured by using one movable capturing camera 231 or the like. However, a plurality of movable capturing cameras can be used. For example, it is possible to use two cameras, that is, a camera for capturing the card images and a camera for capturing the shoe image.

In addition, in the above-described embodiment, the cards C are housed in the shoe 61. However, the cards C may be directly placed on the dealer's game table 60 in a stacked manner without using the shoe 61.

Furthermore, in the above-described embodiment, the movable capturing camera 231 or the like can be moved by the four player terminals 40. However, the number of the player terminals 30 that can move the movable capturing camera 231 or the like is not limited to four. More than four or less than four player terminals 30 can use the movable capturing camera 231 or the like. Additionally, it is also possible provide the movable capturing camera for each player terminal 30.

According to the present invention, since the game player operates the movement of the movable capturing camera, it is possible to reliably prevent fraud by the dealer. Therefore, it is possible to apply the present invention to various kinds of table game systems using game media such as cards.

The present invention is not limited to the specifically disclosed embodiments, and variations and modifications may be made without departing from the scope of the present invention.

What is claimed is:

1. A table game system, comprising:

a dealer's game table for performing a table game;

a movable capturing part that captures game media used in the table game, and allows at least changing of a capturing direction of the movable capturing part;

a plurality of operating parts that are arranged in a game player space provided at a position distant from the dealer's game table, and can change the capturing direction of the movable capturing part; and a display part that can display an image of the game media captured by the movable capturing part, wherein the movable capturing part is configured to be movable by each of the plurality of operating parts, and wherein when one of the operating parts is operating a movement of the movable capturing part, another operating part is disabled from operating the movement of the movable capturing part, and when said one of the operating parts is not operating the movement of the movable capturing part, said another operating part operates the movement of the movable capturing part.

* * * * *